United States Patent
Slack et al.

(10) Patent No.: US 12,474,006 B2
(45) Date of Patent: Nov. 18, 2025

(54) FLUID MANIFOLD CONNECTOR APPARATUS

(71) Applicant: NOETIC TECHNOLOGIES INC., Edmonton (CA)

(72) Inventors: Maurice William Slack, Edmonton (CA); Victor Yung, Edmonton (CA); Alexander Hunt, Edmonton (CA); Donald V. Tomkins, Edmonton (CA)

(73) Assignee: NOETIC TECHNOLOGIES INC., Edmonton (CA)

( * ) Notice: Subject to any disclaimer, the term of this patent is extended or adjusted under 35 U.S.C. 154(b) by 0 days.

(21) Appl. No.: 18/724,024

(22) PCT Filed: Jan. 25, 2023

(86) PCT No.: PCT/CA2023/000003
§ 371 (c)(1),
(2) Date: Jun. 25, 2024

(87) PCT Pub. No.: WO2023/141698
PCT Pub. Date: Aug. 3, 2023

(65) Prior Publication Data
US 2025/0102092 A1  Mar. 27, 2025

Related U.S. Application Data

(60) Provisional application No. 63/303,223, filed on Jan. 26, 2022.

(51) Int. Cl.
*F16L 39/06*  (2006.01)
(52) U.S. Cl.
CPC ................................. *F16L 39/06* (2013.01)
(58) Field of Classification Search
CPC .......... F16L 39/06; F16L 27/087; E21B 17/05
See application file for complete search history.

(56) References Cited

U.S. PATENT DOCUMENTS

| 2,990,851 A | 7/1961 | Jackson et al. |
| 4,029,125 A | 6/1977 | Steydle et al. |

(Continued)

FOREIGN PATENT DOCUMENTS

| CN | 111219556 A | 6/2020 |
| DE | 2132951 A1 | 1/1973 |

(Continued)

OTHER PUBLICATIONS

International Search Report re PCT/CA2023/000003, completed by the ISA/CA on May 16, 2023, and mailed by the ISA/CA on May 19, 2023.

(Continued)

*Primary Examiner* — Zachary T Dragicevich
(74) *Attorney, Agent, or Firm* — Donald V. Tomkins

(57) ABSTRACT

A fluid manifold connector apparatus includes a stinger having fluid channels for receiving fluid from flow lines and discharging the fluid through axially-spaced outlet ports on the stinger, plus a receiver having a bore with inlet ports spaced to match the stinger outlet ports. Annular seals are provided above and below each stinger fluid outlet port, or above and below each receiver fluid inlet port, to form a sealed annular fluid chamber between each axially-adjacent pair of seals when the stinger is disposed within the receiver bore. The flow lines pass through bores in a deformable plug disposed within the bore of a stinger extension sleeve for fluid communication with the upper ends of the stinger fluid channels. A piston assembly is mountable to the sleeve for compressing and deforming the plug to sealingly grip the flow lines and to seal the plug against the bottom of the sleeve bore.

17 Claims, 13 Drawing Sheets

(56) References Cited

U.S. PATENT DOCUMENTS

| | | | |
|---|---|---|---|
| 4,345,784 A | 8/1982 | Walling | |
| 4,553,938 A | 11/1985 | Olsen | |
| 5,293,933 A | 3/1994 | Brisco | |
| 5,378,027 A | 1/1995 | Gehring | |
| 6,412,822 B1 * | 7/2002 | Omiya | F16L 27/087 |
| 6,412,823 B1 * | 7/2002 | Odegaard | F16L 39/06 |
| 6,471,217 B1 | 10/2002 | Hayfield et al. | |
| 6,692,037 B1 | 2/2004 | Lin | |
| 6,948,971 B2 | 9/2005 | Bartholoma et al. | |
| 8,668,003 B2 | 3/2014 | Osmundsen et al. | |
| 9,074,711 B2 | 7/2015 | Huang | |
| 10,211,616 B2 | 2/2019 | Sauer et al. | |
| 11,466,534 B2 | 10/2022 | Slack et al. | |
| 2005/0046181 A1 * | 3/2005 | Falconer | F16L 27/087 |
| 2013/0334448 A1 | 12/2013 | Hodnefjell et al. | |
| 2014/0060853 A1 | 3/2014 | Henderson et al. | |

FOREIGN PATENT DOCUMENTS

| | | |
|---|---|---|
| DE | 4200550 A1 | 7/1993 |
| DE | 29713957 U1 | 10/1997 |
| DE | 20217500 U1 | 2/2003 |
| DE | 202007003957 U1 | 7/2008 |
| EP | 0551664 B1 | 11/1995 |
| EP | 1970614 A1 | 9/2008 |

OTHER PUBLICATIONS

Written Opinion of the International Searching Authority re PCT/CA2023/000003, completed by the ISA/CA on May 19, 2023, and mailed by the ISA/CA on May 19, 2023.

* cited by examiner

FLUID MANIFOLD CONNECTOR APPARATUS

FIELD

The present disclosure relates in general to apparatus for connection and disconnection of multiple fluid flow lines to and from a fluid manifold, such as a multi-channel fluid swivel associated with a top-drive-equipped drilling rig.

BACKGROUND

U.S. Pat. No. 11,466,534 discloses a cementing head apparatus having a multi-channel fluid swivel for deployment on a drilling rig, and this apparatus requires means for connecting multiple fluid control lines from the drilling rig to the non-rotating body (swivel stator) of the fluid swivel. Known means for providing this functionality are not readily adapted to simultaneously:

- provide an optimally compact yet rugged connection;
- reduce the complexity of flow paths on the swivel stator;
- enable quick and simple connection and disconnection of fluid lines; and
- reliably endure the harsh field environments in which drilling rigs may operate.

BRIEF SUMMARY OF THE DISCLOSURE

The present disclosure teaches embodiments of a multi-channel fluid manifold connector apparatus comprising an elongate stinger assembly having a stinger body, and a receiver body having a receiver bore configured to receive a lower section of the stinger body. (The term "stinger" is sometimes used in the petroleum industry to denote an elongate tool or tool component configured for insertion (or "stabbing") into another tool or tool component, and all references in this patent document to a "stinger" or a "stinger assembly" are to be understood in accordance with this specialized definition of the term.)

In one particular embodiment of a fluid manifold connector apparatus in accordance with the present disclosure, the stinger assembly includes a stinger body having a top surface and defining a plurality of stinger fluid channels, each of which extends downward from the top surface of the stinger body and transitions so as to be in fluid communication with a corresponding specific one of multiple fluid outlet ports provided at different axial locations on an exterior surface of the stinger body. Optionally, the plurality of stinger fluid channels may include an auxiliary stinger fluid channel that extends downward from the top surface of the stinger body to an auxiliary fluid outlet port provided on a lower end of the stinger body (as is commonly provided in prior art single-channel bayonet-style fluid connectors).

The stinger assembly also incorporates a stinger extension sleeve (or simply "extension sleeve") extending coaxially upward from the top surface of the stinger body, and having a cylindrical extension sleeve bore. The extension sleeve bore has an open top end and a bottom surface, with the bottom surface being coincident with the top surface of the stinger body (in other words, the terms "the top surface of the stinger body" and "the bottom surface of the extension sleeve bore" refer to the same surface, but may be used interchangeably herein as appropriate to the context).

The receiver bore and the exterior surface of the stinger body are configured to provide a limited clearance fit when the stinger body is inserted into the receiver bore. As used in this particular context in this patent document, the term "limited clearance fit" is to be interpreted as meaning that insertion of the lower stinger section into the receiver bore creates an annular space (or "receiver annulus") between the exterior surface of the stinger body and the receiver bore, where the maximum radial width of the receiver annulus is limited by the dimensions and properties of selected annular seal elements for providing fluid seals between the exterior surface of the stinger body and the receiver bore at selected axial intervals (as discussed in further detail later herein).

The receiver bore is provided with one or more axially-spaced receiver inlet ports extending laterally into the receiver, with each receiver inlet port being axially aligned with a corresponding one of the sealed annular fluid connector chambers, and may include a further receiver inlet port connecting to an end cavity fluid connector chamber defined by the lowermost of the sealing elements in the receiver annulus and a blind end of the receiver bore.

The fluid connector apparatus is provided with stinger retention means to releasably retain the stinger assembly within the receiver bore. By way of non-limiting example, the stinger retention means may comprise a threaded or breech lock stinger retention ring acting between the stinger body and the receiver bore to prevent removal of the stinger from the receiver bore when the retention ring is engaged and to allow removal of the stinger when the retention ring is disengaged.

The fluid connector apparatus also includes flow line connection means for connecting each of a first plurality of flow lines to the apparatus so as to be in fluid communication with a corresponding stinger fluid channel. In one embodiment, the flow line connection means may be provided in the form of a plug made from a deformable material (such as an elastomer), with the plug being insertable into and retractable from the stinger extension sleeve bore when the plug is in an unstressed state, with a lower end surface of the plug in contacting engagement with the top surface of the stinger body (bottom surface of the extension sleeve bore). The plug is formed with a plurality of longitudinal flow line through-bores (alternatively referred to as flow line bores) through which the flow lines can be passed. The number of flow line bores corresponds to the number of stinger fluid channels, and each flow line bore is in axial alignment with a corresponding stinger fluid channel. In one variant of this embodiment of the connector apparatus, a lower portion of each flow line may extend below the lower end surface of the plug and into the upper ends of corresponding stinger fluid channels.

In alternative variants, the lower ends of the flow lines may terminate at or above the lower end surface of the plug; in such alternative variants, sealing engagement of the lower end surface of the plug against the top surface of the stinger body will restrict fluid flow from a given flow line into its corresponding stinger fluid channel and prevent fluid leakage into other stinger fluid channels.

In preferred embodiments, when the plug is in an unstressed state, the diameters of the flow line bores are only minimally larger than the diameters of the corresponding flow lines, which for purposes of this patent document is to be understood as meaning that the difference between the flow line bore diameters and the flow line diameters is large enough to enable the flow lines to be inserted into and retracted from the flow line bores when the plug is in an unstressed state, without binding within the flow line bores, but small enough that sufficient compression of the plug will cause the flow lines to be gripped by the plug so as to prevent axial movement of the flow lines relative to the plug and to provide a fluid seal between the outer surfaces of the flow lines and the flow line bores. For purposes of this patent document, this relationship between the diameters of the flow lines and the flow line bores may be referred to as a "minimal tolerance fit". The maximum difference between the diameters of the flow lines and the flow line bores in a minimal tolerance fit will depend at least in part on the physical characteristics and properties of the material used to form the plug.

Similarly, in preferred embodiments, the plug in an unstressed state has a cylindrical outer surface having a diameter only minimally less than the extension sleeve bore diameter, which for purposes of this patent document means that the extension sleeve bore diameter exceeds the plug diameter only enough to enable the plug to be inserted into and retracted from the extension sleeve bore without binding on the extension sleeve bore. In alternative embodiments, however, the outer surface of the plug in its unstressed state could be other than cylindrical, or it could be cylindrical but with a diameter fitting more loosely within the extension sleeve bore diameter, depending on the mechanical properties of the material used for the plug as well as its particular configuration.

The fluid connector apparatus further includes plug compression means for applying axial compressive force to the plug, while disposed within the extension sleeve bore with flow lines installed in its flow line bores, to induce multi-axial stress and strain and resultant deformation (which could be either elastic deformation or plastic deformation, or a combination of both) such that:

the plug will sufficiently grip the flow lines to prevent axial movement of the flow lines relative to the plug, and to provide a fluid seal between the outer surfaces of the flow lines and the flow line bores; and the lower end of the plug will form a fluid seal against the top surface of the stinger body.

In one exemplary embodiment, the plug compression means comprises a generally cylindrical piston having an outer surface and a piston bore, and being configured to apply compressive force to the upper end of the plug, either directly or through intermediary components or structure, when the plug is disposed within the extension sleeve bore with flow lines projecting upward from the plug and extending through the piston bore. An annular drive flange projects from the outer surface of the piston, for engagement with a downward-facing annular drive shoulder formed in the bore of a generally cylindrical collar (also referred to as a piston drive collar) that is mountable over and around the piston. A lower region of the drive collar bore is internally threaded for mating engagement with an externally-threaded upper region of the stinger extension sleeve. Rotation of the piston drive collar (such as manual rotation by a wrench) will cause the drive shoulder of the drive collar to compressively engage the drive flange of the piston, thus inducing stress and strain and resultant deformation of the plug to clamp and seal the flow lines within their corresponding flow line bores, and to seal the lower end of the plug against the top surface of the stinger body as previously described.

Optionally, and as illustrated in the Figures, a piston spacer may be disposed between the upper end of the plug and the lower end of the cylindrical piston, with the piston spacer being configured to allow passage of the flow lines. The primary purpose of the piston spacer is to transfer compressive load from the piston to the plug without direct rotational frictional contact between the lower end of the piston and the upper surface of the plug as the piston drive collar is rotated, and for that purpose the piston spacer is preferably made from a material have a surface hardness comparable to that of the piston, and which therefore can readily endure such direct rotational frictional contact with the lower end of the piston without significant wear. In alternative embodiments, the piston spacer may be made from a softer material (e.g., brass or bronze), such as in cases where the expected number of assembly cycles is low, and wear resistance therefore is not a primary concern.

In a first variant embodiment, and as most clearly seen in FIG. 3, passage of the flow lines through the piston spacer can be accommodated by separate flow line bores passing through the spacer and arrayed to match the layout of the flow line bores in the plug. This variant has the advantage of maximizing the surface contact area between the piston spacer and the plug, thus promoting optimally uniform contact pressures and induced stresses and strains in the plug.

In a second variant embodiment, the piston spacer can be of ring-like or cylindrical configuration, with a single central opening or bore to accommodate passage of all flow lines, such that compressive force from the piston will be transferred from the spacer to the plug along a circular contact path surrounding the flow lines. Although this variant might result in higher contact pressures and less uniform induced stresses and strains in the plug, it may still provide acceptable performance depending on the materials used for the plug and the spacer. Similarly, the functional viability of variant embodiments that do not incorporate a piston spacer will depend upon the materials used for the plug and the piston.

In all cases, it is preferable (though not essential) for the plug, and the piston spacer when provided, to be keyed to prevent rotation relative to the extension sleeve bore, and to prevent resultant transverse shear load acting on the flow lines. In alternative variants, the piston may be keyed to prevent rotation relative to the extension sleeve bore.

Optionally, the diameters of the annular fluid connector chambers and associated annular seals may progressively decrease from the top of the stinger toward the bottom of the stinger.

Optionally, means may be provided for preventing the piston drive collar from unthreading from the stinger extension sleeve, such as a locking pin or a ratchet and pawl mechanism.

Embodiments of a fluid manifold fluid connector apparatus in accordance with the present disclosure may also incorporate fluid swivels that connect the non-rotating flow lines from a drilling rig to the rotating portion of a cementing head that engages the casing string. The orientation of the stinger axis may be selected to be parallel to the axis of the fluid swivel. When thus selected, the receiver inlet ports may be simple radial holes in the receiver body.

Embodiments of a fluid manifold fluid connector apparatus in accordance with the present disclosure may also be configured to form an in-line coupler for joining two multi-channel hose bundles.

Optionally, embodiments in accordance with the present disclosure may be configured such that the axial position of the stinger body within the receiver bore is selectable from among a plurality of axial positions. The selected axial position of the stinger body within the receiver bore may be maintained by any functionally effective means, such as (by way of non-limiting examples) a spring-loaded ball and groove mechanism, a threaded mechanism, or a breech lock mechanism disposed between the stinger assembly and the receiver bore. Stinger outlet ports may be configured such that the sealed annular fluid connector chambers (formed by the seal elements when the stinger body is disposed within the receiver bore) are not intersected by a receiver inlet port. The receiver inlet ports are configured such that adjusting the axial position of the stinger body will result in either one or more stinger outlet ports becoming in the fluid communication with a different receiver inlet port or ports, or one or more stinger outlet ports no longer being in fluid communication with any receiver inlet port.

BRIEF DESCRIPTION OF THE DRAWINGS

Embodiments in accordance with the present disclosure will now be described with reference to the accompanying Figures, in which numerical references denote like parts, and in which.

DETAILED DESCRIPTION

FIGS. 1, 2, 3, and 4 illustrate a first embodiment 1300 of a fluid manifold connector apparatus in accordance with the present disclosure. Apparatus 1300 comprises:
- an elongate stinger assembly 1380 having a generally axisymmetric stinger 1310 having a longitudinal axis $X_1$ and defining a stinger body 1322 having a top surface 1319, plus a stinger extension sleeve 1324 extending upward from top surface 1319, with stinger body 1322 having a generally cylindrical exterior surface 1326; and
- a receiver body 1390 having a receiver bore 1394 and a receiver wall 1390W, with receiver bore 1394 defining a receiver bore surface 1393 and being configured to receive a lower section of stinger body 1322.

Figure 1:
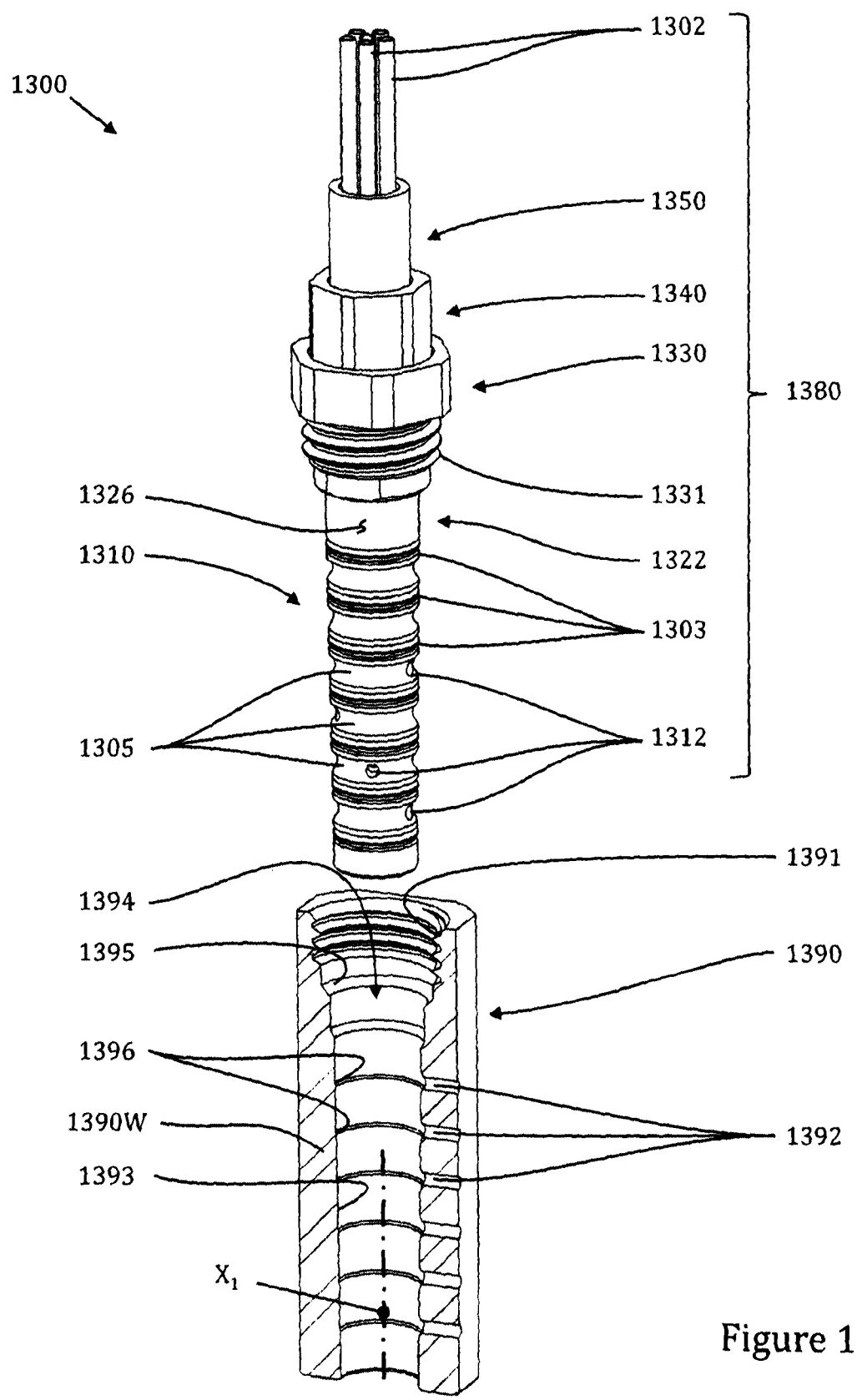
FIG. 1 is an isometric view of a first embodiment of a fluid manifold connector apparatus in accordance with the present disclosure, shown with the apparatus's stinger assembly removed from the bore of the apparatus's receiver body (shown in section).

FIG. 1 is an isometric view of apparatus 1300 with stinger assembly 1380 shown disengaged from receiver body 1390, and with receiver body 1390 shown in section to illustrate the internal features of receiver bore 1394. Stinger assembly 1380 further comprises a stinger retention ring 1330, a plug 1370, a piston spacer 1360, a piston 1350, and a piston drive collar 1340. A plurality of axially-spaced receiver fluid inlet ports 1392 extend laterally through receiver wall 1390W.

Figure 2:
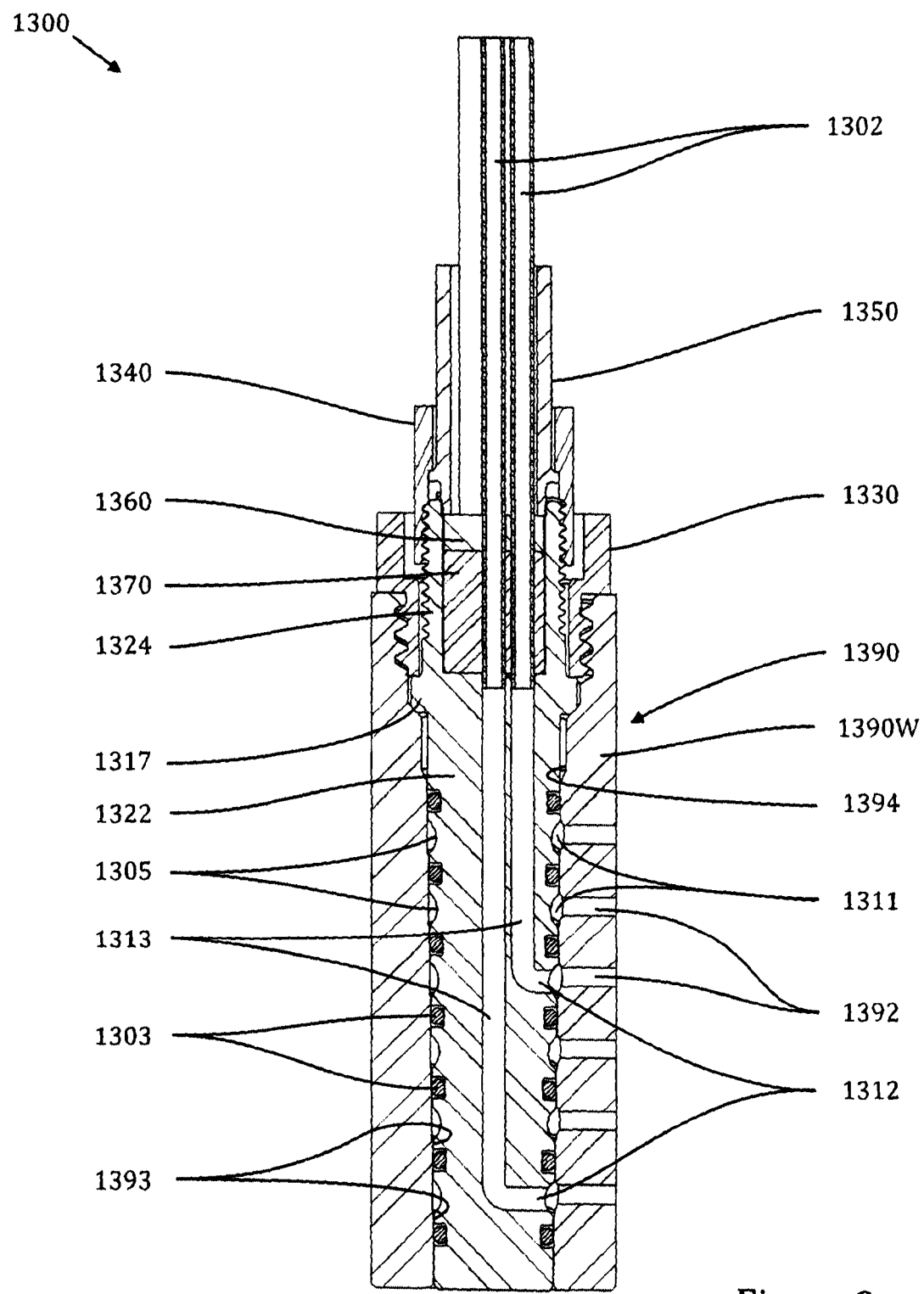
FIG. 2 is a longitudinal section through the apparatus in FIG. 1, shown with the lower section of the stinger body disposed within the receiver bore.

FIG. 2 is a longitudinal section through apparatus 1300 with the lower section of stinger body 1322 shown disposed within receiver bore 1394. An annular flange 1317 projects from an upper region of exterior surface 1326 of stinger body 1322, and is configured to be received in an annular recess 1395 in receiver wall 1390W when stinger body 1322 is inserted into receiver bore 1394, such that the axial position of annular recess 1395 will define the maximum insertion depth of stinger body 1322 within receiver bore 1394. Stinger extension sleeve 1324 has a smooth-walled extension sleeve bore 1315 with an open upper end 1315U, and a bottom surface formed by top surface 1319 of stinger body 1322. Stinger extension sleeve 1324 also carries an external thread 1314, for purposes described later herein.

When stinger body 1322 has been installed within receiver bore 1394, stinger retention ring 1330 may be rotated around extension sleeve 1324 such that an external thread 1331 on a lower region of stinger retention ring 1330 engages an internal thread 1391 formed in receiver bore 1394 above annular recess 1395, until the lower end of stinger retention ring 1330 is proximal to an upward-facing annular shoulder 1317A on annular flange 1317 of stinger body 1322, and thus to axially retain stinger assembly 1380 within receiver bore 1394 while allowing stinger 1310 to rotate within receiver bore 1394.

As best seen in FIG. 2, stinger body 1322 defines a plurality of stinger fluid channels 1313, each having an upper end 1313U at stinger body top surface 1319 and extending downward therefrom to a specific corresponding stinger outlet port 1312 on the exterior surface of stinger body 1322. In the exemplary embodiment shown in FIG. 2, stinger outlet ports 1312 are axially spaced to match the axial spacing of receiver fluid inlet ports 1392. A first plurality of fluid flow lines 1302 (equal in number to the number of stinger fluid channels 1313) may be connected to stinger assembly 1380 such that each flow line 1302 is in fluid communication with upper end 1313U of a specific corresponding stinger fluid channel 1313, such that fluid flowing downward in flow lines 1302 will flow through the corresponding stinger fluid channels 1313.

In the illustrated embodiment, a plurality of annular seal elements 1303 are carried in annular seal grooves 1304 formed in exterior surface 1326 of stinger body 1322, such that each stinger outlet port 1312 is positioned between an axially-adjacent pair of seal elements 1303. When the lower section of stinger body is installed within receiver bore 1394, annular seal elements 1303 will engage receiver bore surface 1393 to form a series of axially-spaced sealed annular fluid connector chambers 1311.

Figure 9:
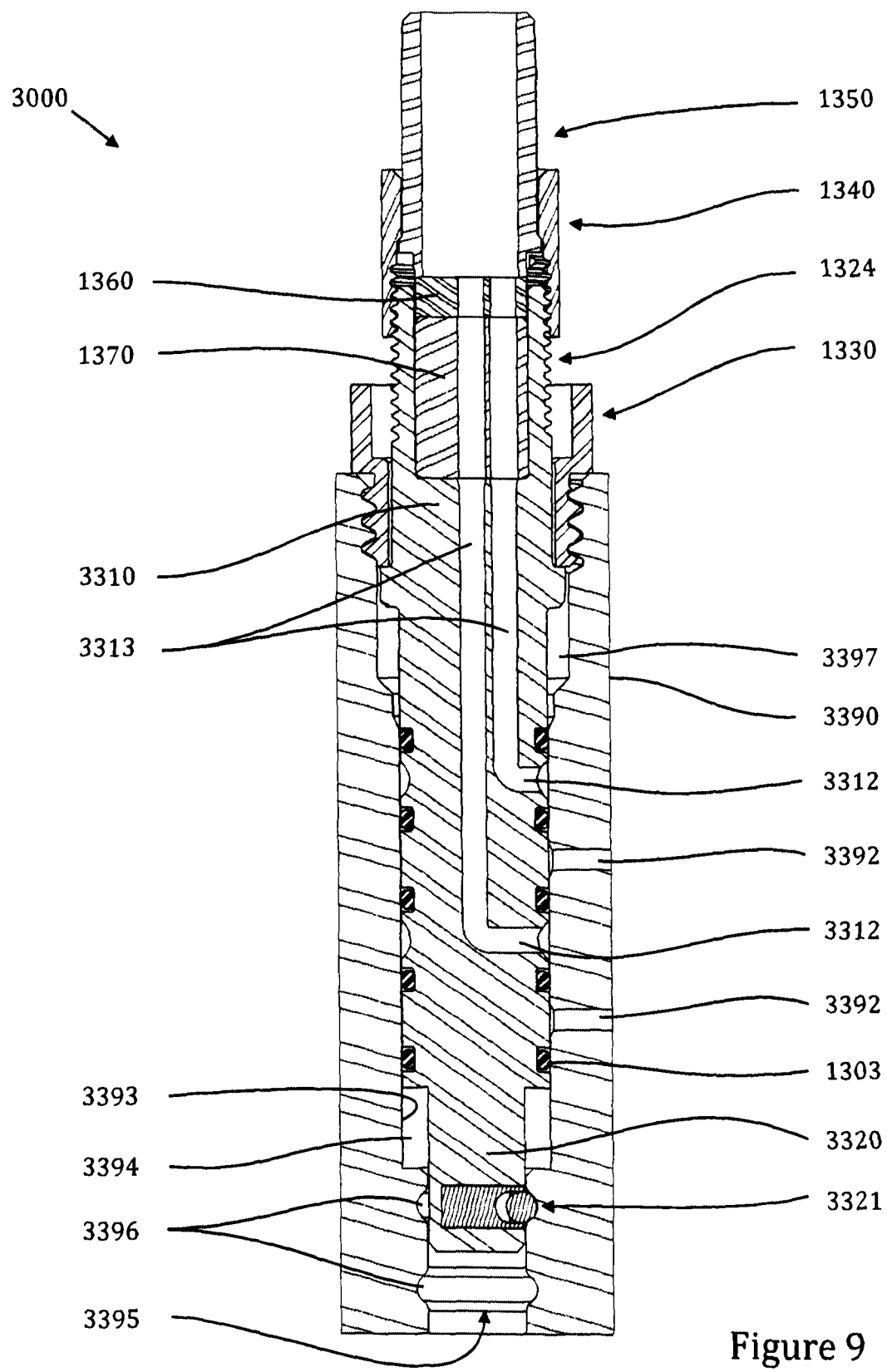
FIG. 9 is a longitudinal section through a third embodiment of a fluid manifold connector apparatus in accordance with the present disclosure in which the stinger body is selectively movable between discrete upper and lower axial positions within the receiver bore, and is shown with the stinger body in the upper axial position.
Figure 10:
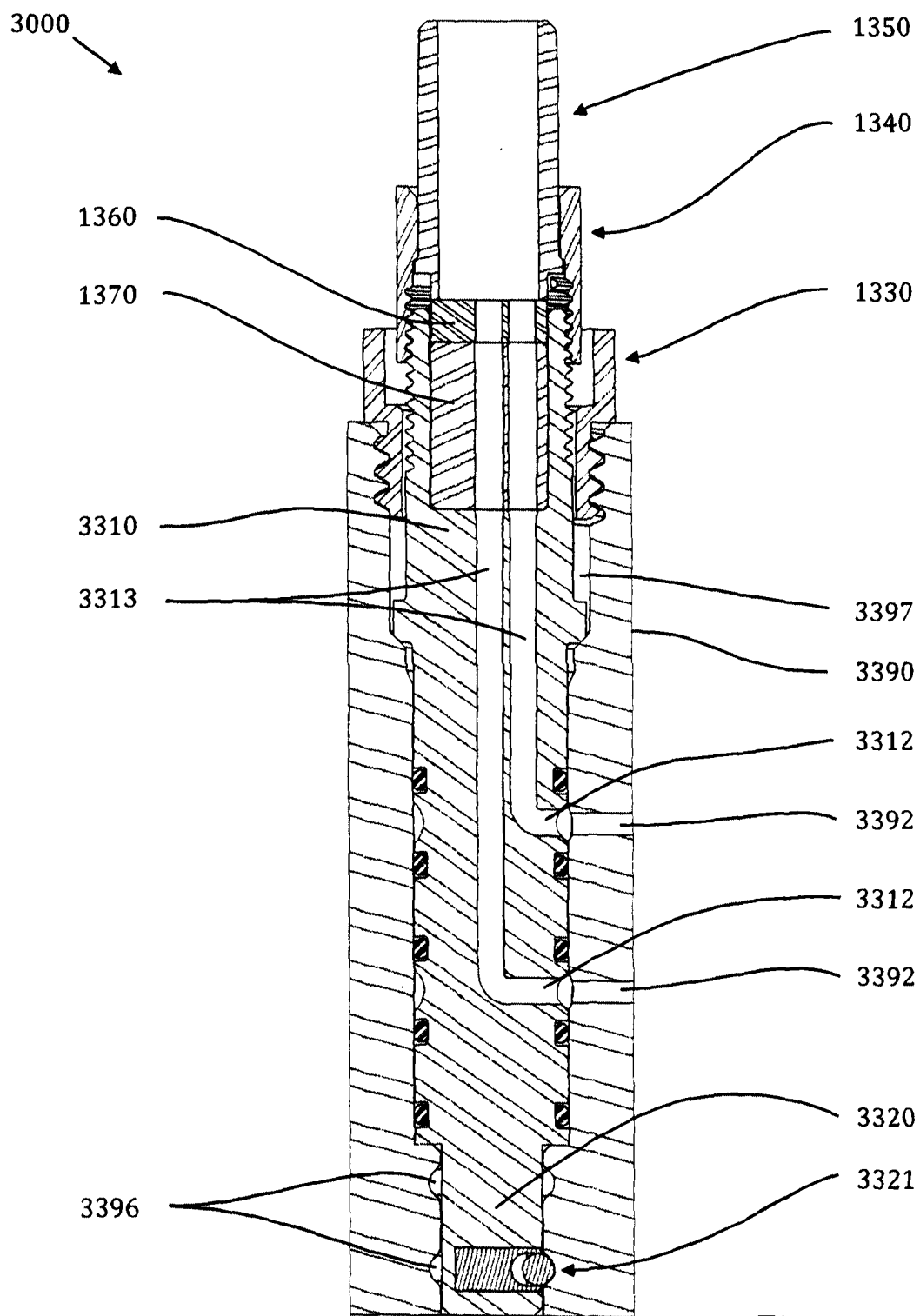
FIG. 10 is a longitudinal section through the apparatus in FIG. 9, shown with the stinger body in the lower axial position.

The diameter of receiver bore 1394 may be constant (such as may necessarily be the case in embodiments enabling selective movement of stinger 1310 between multiple axial positions within receiver bore 1394, as in the embodiment illustrated in FIGS. 9 and 10). However, in the particular embodiment of apparatus 1300 illustrated in FIGS. 1-4, and as best seen in FIGS. 1 and 2, the diameter of receiver bore 1394 becomes incrementally smaller toward its lower end, by means of diameter stepdowns (indicated by reference number 1396) approximately coincident with receiver fluid inlet ports 1392. This configuration is advantageous in that a receiver bore 1394 having a downwardly-decreasing diameter facilitates stabbing of stinger body 1322 into receiver bore 1394 by reducing the axial length for which seal elements 1303 are engaged with receiver bore 1394 during installation. In alternative embodiments, the diameter of receiver bore 1394 may be reduced by providing a uniform taper on receiver bore surface 1393, rather than by providing stepdowns.

Fluid flow rates within fluid connector chambers 1311 will be constrained by the radial width of the annulus between stinger exterior surface 1326 and receiver bore surface 1393. However, fluid flow rates may be improved by providing annular recesses 1305 on stinger exterior surface 1326 as shown in FIGS. 1-4, with each annular recess 1305 intercepting one of the stinger fluid outlet ports 1312, and thereby increasing the cross-sectional flow area of fluid connector chambers 1311. The same effect may be achieved by providing annular recesses on receiver bore surface 1393, with each such annular recess intercepting one of the receiver fluid inlet ports 1392, as an alternative to or additional to annular recesses 1305 on stinger exterior surface 1326.

Figure 3:
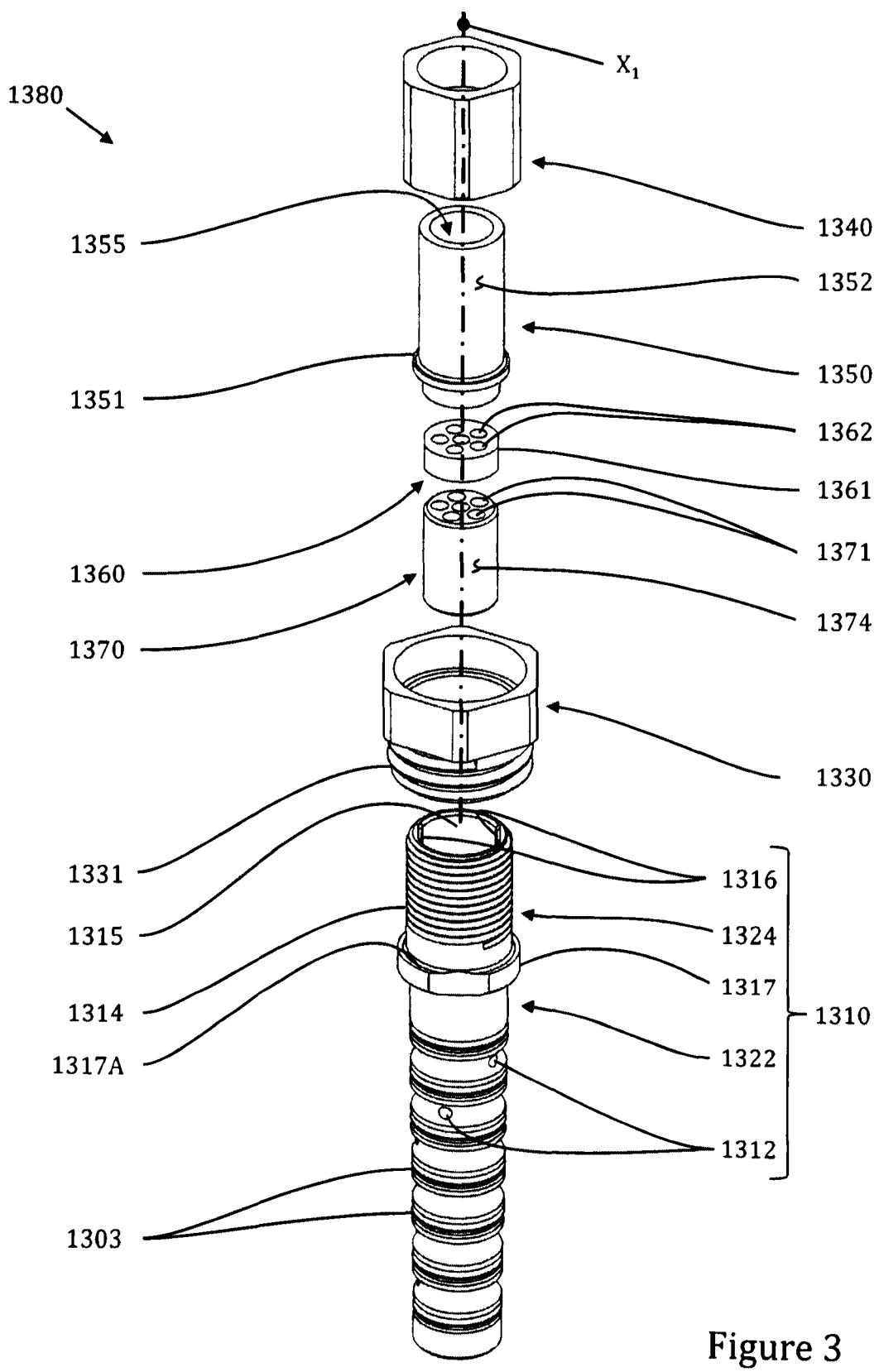
FIG. 3 is an exploded isometric view of the stinger assembly in FIG. 1.
Figure 4:
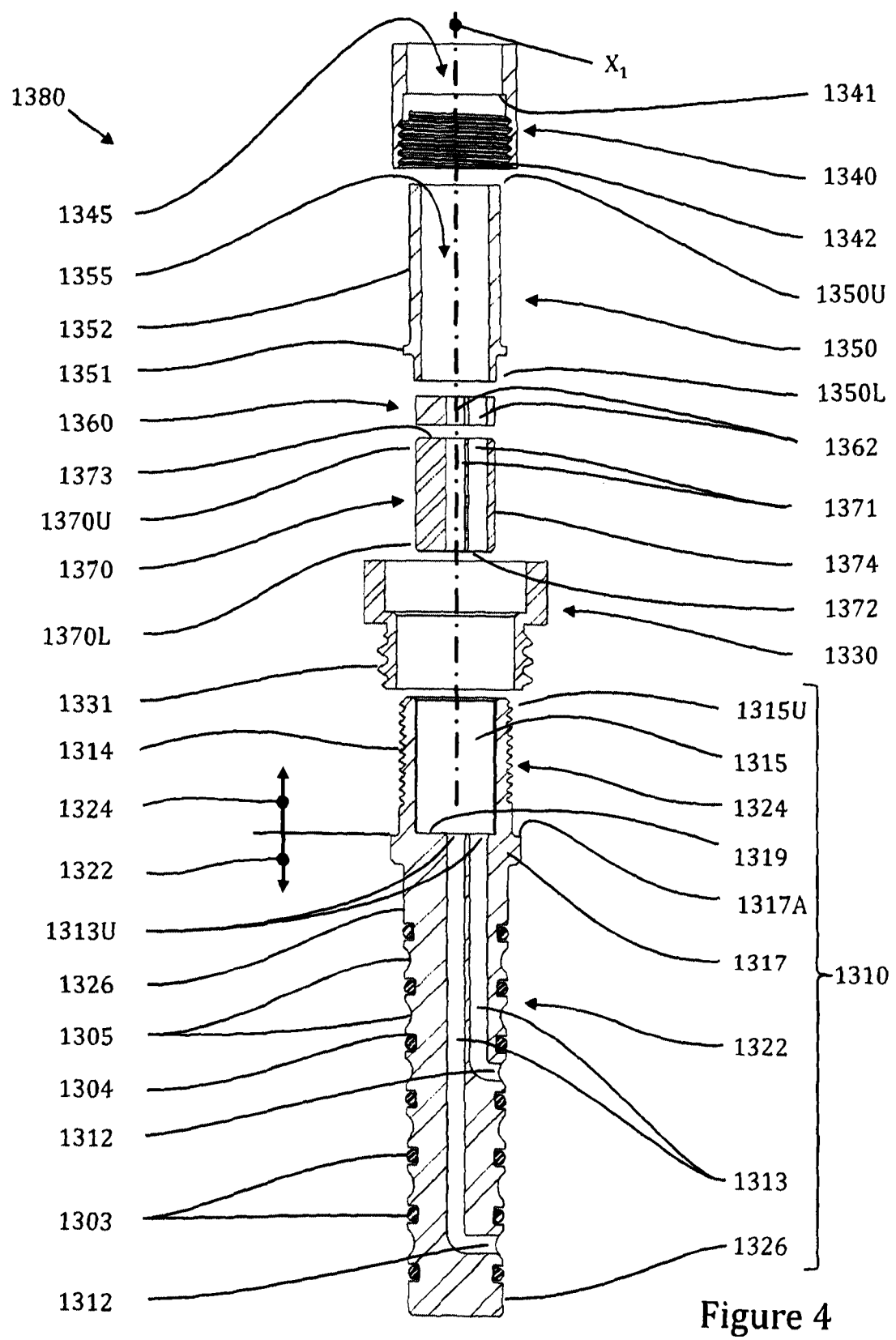
FIG. 4 is an exploded longitudinal section through the stinger assembly in FIG. 1.

FIGS. 3 and 4 are, respectively, isometric and cross-sectional exploded views of stinger assembly 1380, illustrating one exemplary means for connecting the first plurality of fluid flow lines 1302 (not shown for clarity) to stinger assembly 1380 so as to be in fluid communication with corresponding stinger fluid channels 1313, comprising a plug 1370 made from a suitably deformable and impermeable material (such as, by way of non-limiting example, an elastomeric material). As used in this document in the specific context of plug 1370, the term "impermeable" is intended to be understood as meaning sufficiently impermeable to any fluid (which may be either a gas or a liquid) contained within or flowing through any component of apparatus 1300 as to prevent leakage of such fluid through plug 1370 during normal operation of apparatus 1300.

In the particular embodiment shown in FIGS. 3 and 4, plug 1370 has an upper end 1370U, a lower end 1370L, an upper end surface 1373, a lower end surface 1372, and a cylindrical outer surface 1374 having a diameter that preferably is only minimally less than the diameter of extension sleeve bore 1315.

A plurality of flow line bores 1371 extend through plug 1370 from plug upper end 1370U to plug lower end 1370L, for receiving the first plurality of flow lines 1302. In preferred embodiments, the difference between the diameters of flow lines 1302 and flow line bores 1371 will be selected to produce a "minimal tolerance fit", for at least a portion of the length of flow line bores 1371, such that sufficient compression of plug 1370 will cause flow lines 1302 to be gripped by plug 1370 so as to prevent axial movement of flow lines 1302 within flow line bores 1371 and to provide a fluid seal between the outer surface of each flow line 1302 and its corresponding flow line bore 1371.

As most clearly seen FIGS. 1 and 3, fluid manifold connector apparatus 1300 is illustrated as having a total of six fluid flow lines 1302 passing through a total of six flow lines bores 1371 in plug 1370. However, it should be understood that the number of fluid flow lines 1302 and flow lines bores 1371 could be greater or less than six. As well, in some applications apparatus 1300 will not necessarily require a fluid flow line 1302 to be installed in each of flow lines bore 1371; in such applications, any flow lines bore 1371 not receiving a fluid flow line 1302 may be temporarily blocked off, although that may not be essential for satisfactory operation of apparatus 1300.

Flow line bores 1371 in plug 1370 are configured such that the pattern of flow line bores 1371 where they intercept plug lower end surface 1370L matches the pattern of upper ends 1313U of stinger fluid channels 1313, such that when plug 1370 is seated within extension sleeve bore 1315, in an appropriate rotational orientation and with plug lower end surface 1370L seated on the bottom surface of extension sleeve bore (i.e., top surface 1319 of stinger body 1322), the lower end of each flow line bore 1371 (i.e., at plug lower end 1370L) will be aligned with a corresponding one of stinger fluid channels 1313. Optionally, plug 1370 may be rotationally indexed to extension sleeve 1324 by any suitable means (such as keying) to facilitate and maintain alignment of flow line bores 1371 with upper ends 1313U of respective stinger fluid channels 1313.

As illustrated in FIG. 2, the first plurality of flow lines 1302 can be passed through flow line bores 1371 and extended partially into corresponding stinger fluid channels 1313 in stinger body 1322. However, this is by way of non-limiting example only. In variant embodiments, flow lines 1302 can be inserted into flow line bores 1371 such that their lower ends do not project below plug lower end surface 1370L, or such that their lower ends are slightly above plug lower end 1370L. In such variant embodiments, as well as in embodiments as in FIG. 2, sealing engagement of lower end surface 1370L of plug 1370 against top surface 1319 of stinger body 1322 will prevent fluid leakage at this interface and ensure that fluid flowing through a given flow line 1302 will flow into its corresponding stinger fluid channel 1313.

In the illustrated embodiment, means for compressing plug 1370 to grip and seal flow lines 1302 within flow line bores 1371 are provided by a tubular piston drive collar 1340, a tubular piston 1350 coaxially positioned above plug 1370, with a piston spacer 1360 disposed between a lower end 1350L of piston 1350 and upper end 1370U of plug 1370. Piston spacer 1360 is shown with a plurality of piston spacer bores 1362, arranged in a pattern generally corresponding to the pattern of flow line bores 1371 in plug 1370, for passage of the first plurality of flow lines 1302. Because there is no requirement for a fluid seal between flow lines 1302 and piston spacer 1360, the diameter of piston spacer bores 1362 can be greater than the diameter of flow line bores 1371 in plug 1370. Optionally, and as best seen in FIG. 3, piston spacer 1360 may be rotationally indexed to extension sleeve 1324 by engagement of piston spacer keys 1361 and extension sleeve keys 1316.

Although piston spacer 1360 is shown in FIGS. 3 and 4 as having piston spacer bores 1362 for receiving individual flow lines 1302, this is by way of non-limiting example only. In alternative embodiments, piston spacer 1360 may have a single central opening (or bore) through which all of the first plurality of flow lines 1302 can pass, or may have one or more openings through which two or more flow lines 1302 can pass.

Piston 1350 further has an upper end 1350U and an outer surface 1352, plus a piston bore 1355 allowing passage of the first plurality of flow lines 1302. An annular drive flange 1351 projects from the piston outer surface 1352, proximal to piston lower end 1350L. In the illustrated embodiment, piston outer surface 1352 is a cylindrical surface, but this is not essential. In variant embodiments, outer surface 1352, or any portion thereof, could be of any shape in transverse cross-section (such as hexagon, octagonal, or any regular polygonal shape, to provide a few non-limiting examples). Preferably, however, piston outer surface 1352 will be generally cylindrical at piston lower end 1350L, with a diameter at least approximately corresponding to the diameter (or nominal diameter) of plug outer surface 1374.

Piston drive collar 1340 has a drive collar bore 1345 sized to allow piston drive collar 1340 to be installed over and around piston 1350. In the illustrated embodiment, drive collar bore 1345 also defines a downward-facing annular drive shoulder 1341 which is engageable with an upward-facing surface of the piston, such as an upward-facing annular drive flange 1351 projecting from outer surface 1352 of piston 1350 as shown in FIGS. 3 and 4. A portion of drive collar bore 1345 carries an internal drive collar thread 1342 which is engageable with an external thread 1314 on stinger extension sleeve 1324. When drive collar thread 1342 engages extension sleeve thread 1314, rotation of drive collar 1340 relative to stinger 1310 will bring drive shoulder 1341 into contact with piston drive flange 1351. Continued rotation of drive collar 1340 will urge piston 1350 into downward compressive engagement against piston spacer 1360 (or against plug upper end surface 1373, in embodiments not having piston spacer 1360), consequently deforming plug 1370 within extension sleeve bore 1315.

It is to be understood that the particular configurations of piston drive collar 1340 and piston 1350 described above are exemplary only, and in variant embodiments these could be configured differently without affecting their cooperative functionality. For example, in one variant embodiment, piston 1350 could have a uniform outer surface 1352, without annular drive flange 1351, while the diameter of drive collar bore 1345 below drive shoulder 1341 would provide for a close fit around piston outer surface 1352, such that drive shoulder 1341 would be engageable with an upward-facing surface provided by upper end 1350U of piston 1350 in lieu of drive flange 1351, with the axial lengths of drive collar 1340 and piston 1350 adjusted as appropriate. In this variant embodiment, drive shoulder could be provided closer to the upper end of drive collar 1340 than shown in the illustrated embodiments.

The stress and resultant strain thus induced in plug 1370 will cause plug 1370 to sealingly grip the outer surfaces of flow lines 1302 passing through flow line bores 1371 in plug 1370, and to seal plug lower end surface 1372 against top surface 1319 of stinger body 1322. It will be appreciated by persons skilled in the art that the magnitude of the stress induced in plug 1370 will control sealing effectiveness, which is best assured when the induced contact stress at all plug sealing surfaces exceeds the fluid pressure to be contained, and this may be achieved by selecting the torque applied to drive collar sleeve 1340.

Furthermore, resistance to axial pull-out of flow lines 1302 from flow line bores 1371 will be a function of the surface area of flow line bores 1371 engaging the outer surfaces of flow lines 1302, the friction properties of the interface between flow line bores 1371 and the outer surfaces of flow lines 1302, and the induced contact stress between plug 1370 and flow lines 1302. These variables can be arranged to react both the pressure end load force and externally-applied tension to flow lines 1302 as needed for a given application by adjusting parameters such as the tubing surface roughness, selection of the elastomer material for plug 1370 to increase friction, selecting the torque applied to drive collar sleeve 1340, and selection of geometry variables such as the length of plug 1370 to increase the engaged surface area.

Having reference to the particular embodiment shown in FIGS. 1-4, one exemplary procedure for assembly of stinger assembly 1380, preparatory to operative engagement of stinger assembly 1380 with receiver body 1390, would involve the following steps (in any appropriate sequence):

- inserting upper end 1350U of piston 1350 into piston drive collar bore 1345, such that annular drive shoulder 1341 in drive collar bore 1345 is disposed above annular drive flange 1351 on piston 1350;
- inserting the first plurality of flow lines 1302 through piston bore 1355;
- inserting flow line 1302 through piston spacer bores 1362 in piston spacer 1360;
- inserting flow lines 1302 into flow line bores 1371 in plug 1370;
- aligning piston spacer key(s) 1361 with extension sleeve key(s) 1316, and insert plug 1370 and piston spacer 1360 (carrying flow lines 1302) into extension sleeve bore 1315;
- optionally, inserting the lower end of each flow line 1302 into upper end 1313U of a corresponding stinger fluid channel 1313;
- threadingly engaging drive collar 1340 with extension sleeve 1324, to compress plug 1370 as required to axially retain and seal flow lines 1302 within flow line bores 1371; and
- in embodiments in which stinger body 1322 carries annular seal grooves 1304, installing seal elements 1303 in seal grooves 1304.

When stinger assembly 1380, thus assembled, is operatively engaged with receiver body 1390, with stinger body 1322 disposed within receiver bore 1394 and retained therein by stinger retention ring 1330, each one of the first plurality of flow lines 1302 will be sealingly connected to, and in fluid communication with, a corresponding receiver fluid inlet port 1392, via one of the stinger fluid channels 1313 and its corresponding stinger fluid outlet 1312, and a corresponding annular fluid connector chamber 1311. This fluid communication will remain in effect notwithstanding rotation of stinger 1310 relative to receiver body 1390.

Figure 2A:
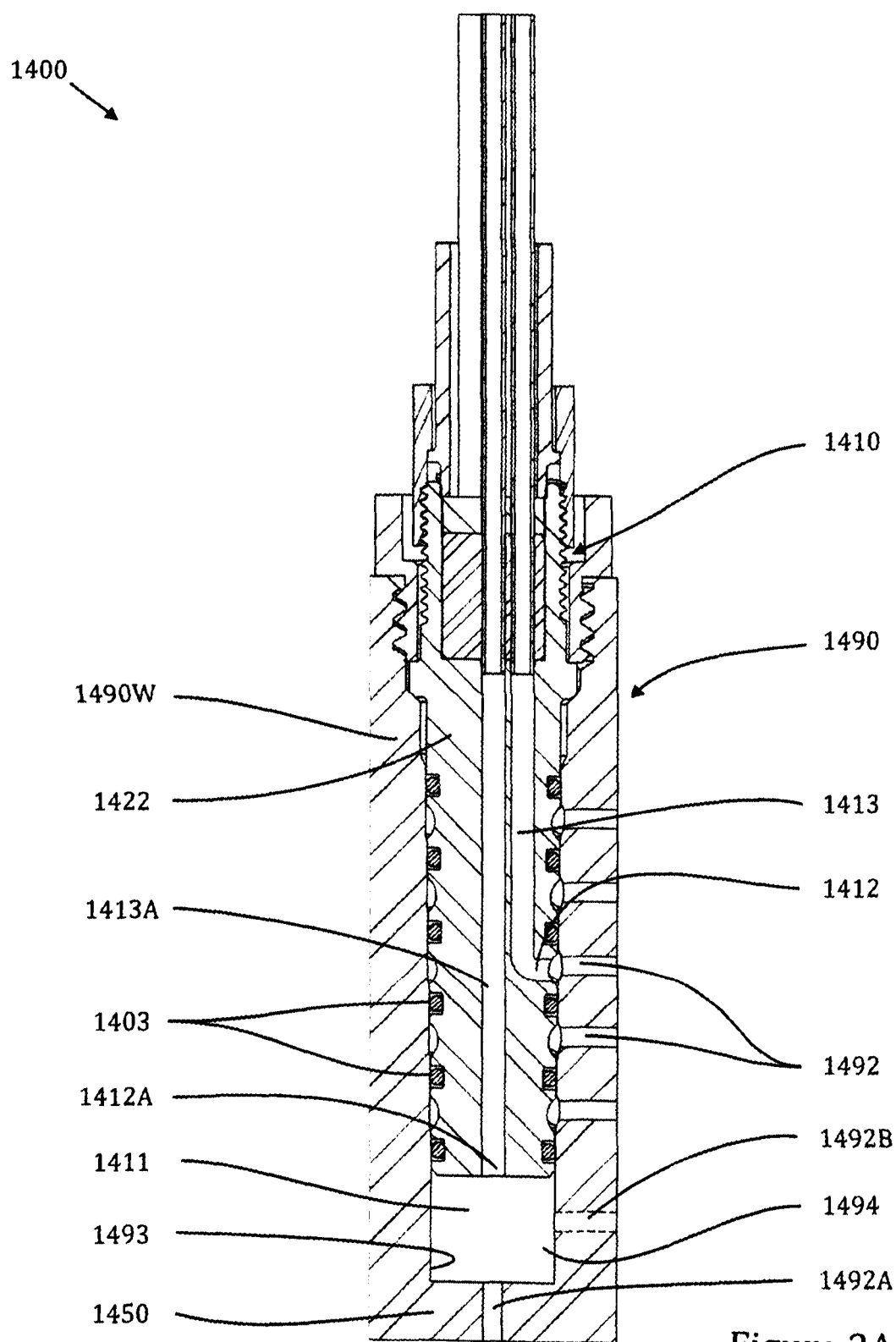
FIG. 2A is a longitudinal section through a variant of the apparatus shown in FIGS. 1 and 2, in which an auxiliary fluid chamber is formed between the lower end of the stinger and a blind lower end of the receiver bore.

FIG. 2A illustrates a variant embodiment 1400 of a fluid manifold connector apparatus comprising a stinger 1410 (analogous to stinger 1310) incorporating a stinger body 1422 and a receiver body 1490. Stinger body 1422 carries annular seal elements 1403 as in stinger body 1322 of apparatus 1300, and has stinger fluid channels 1413 and stinger fluid outlet ports 1412 generally as in stinger body 1322 of apparatus 1300. Receiver body 1490 has a receiver wall 1490W with receiver fluid inlet ports 1492 extending through receiver wall 1490W generally as in receiver body 1390 of apparatus 1300. For the sake of clarity, no reference numbers are shown in FIG. 2A for other elements of apparatus 1400 that are essentially identical to corresponding elements in apparatus 1300.

Receiver body 1490 has a receiver bore 1494 with a blind lower end 1450, and an auxiliary receiver fluid inlet port 1492A extends axially through receiver bore blind end 1450. When stinger body 1422 is disposed within receiver bore 1494, a lower end fluid chamber 1411 is formed between the lowest sealing element 1403 and receiver bore blind end 1450 when stinger body 1422 is disposed within receiver bore 1494. A single auxiliary stinger fluid channel 1413A extends downward through stinger body 1422 to an auxiliary stinger fluid outlet port 1412A so as to be in fluid communication with auxiliary receiver fluid inlet port 1492A. In a variant of this embodiment, auxiliary stinger fluid channel 1413A may instead be in fluid communication with an auxiliary receiver fluid inlet port 1492B extending laterally through receiver wall 1490W below the lowermost annular seal element 1403 (as indicated by broken lines in FIG. 2A).

Figure 5:
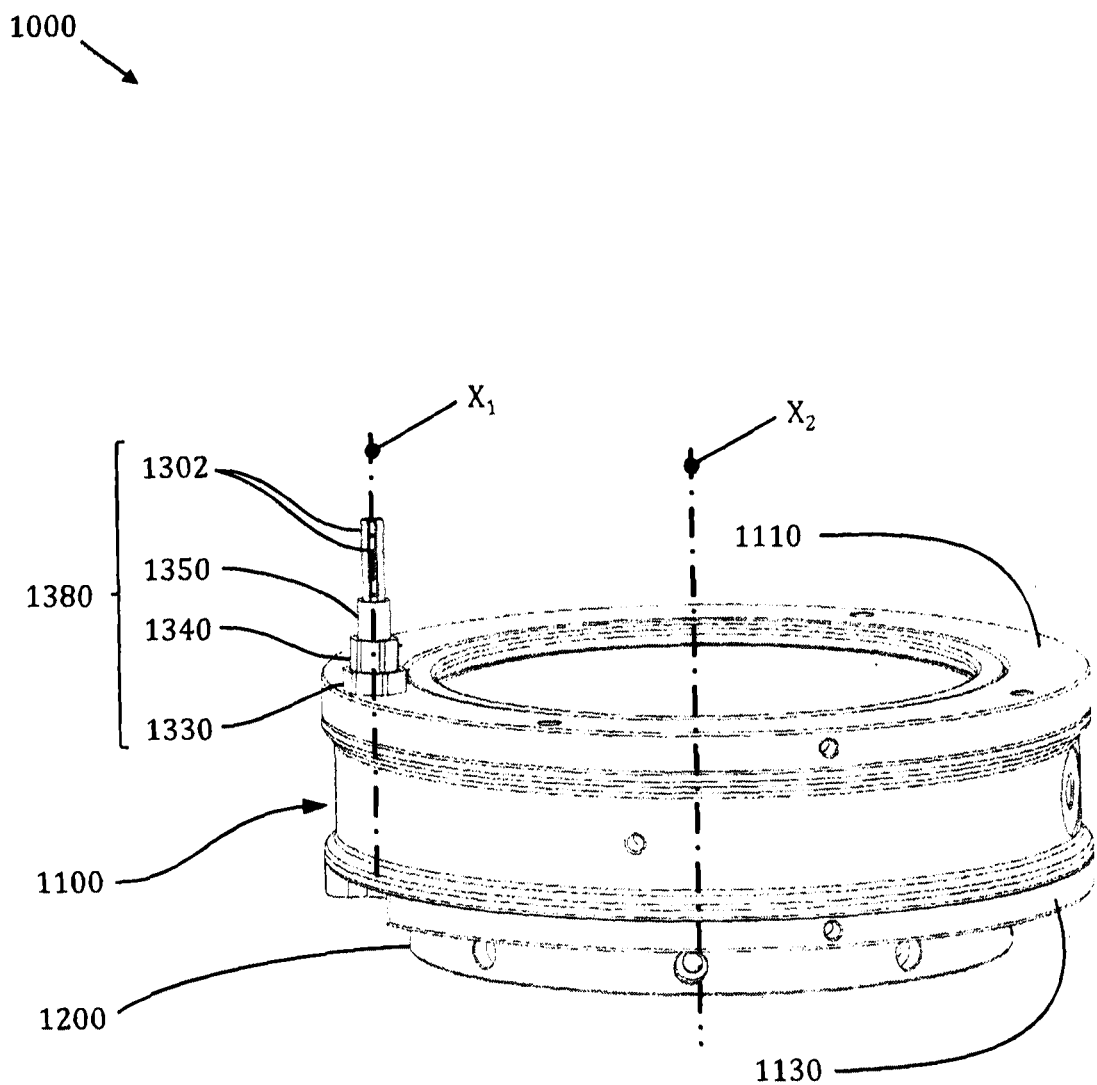
FIG. 5 is an isometric view of a multi-channel fluid swivel apparatus incorporating a fluid manifold connector apparatus in accordance with the present disclosure in which the connector apparatus is used to connect multiple flow lines to the fluid swivel apparatus.
Figure 6:
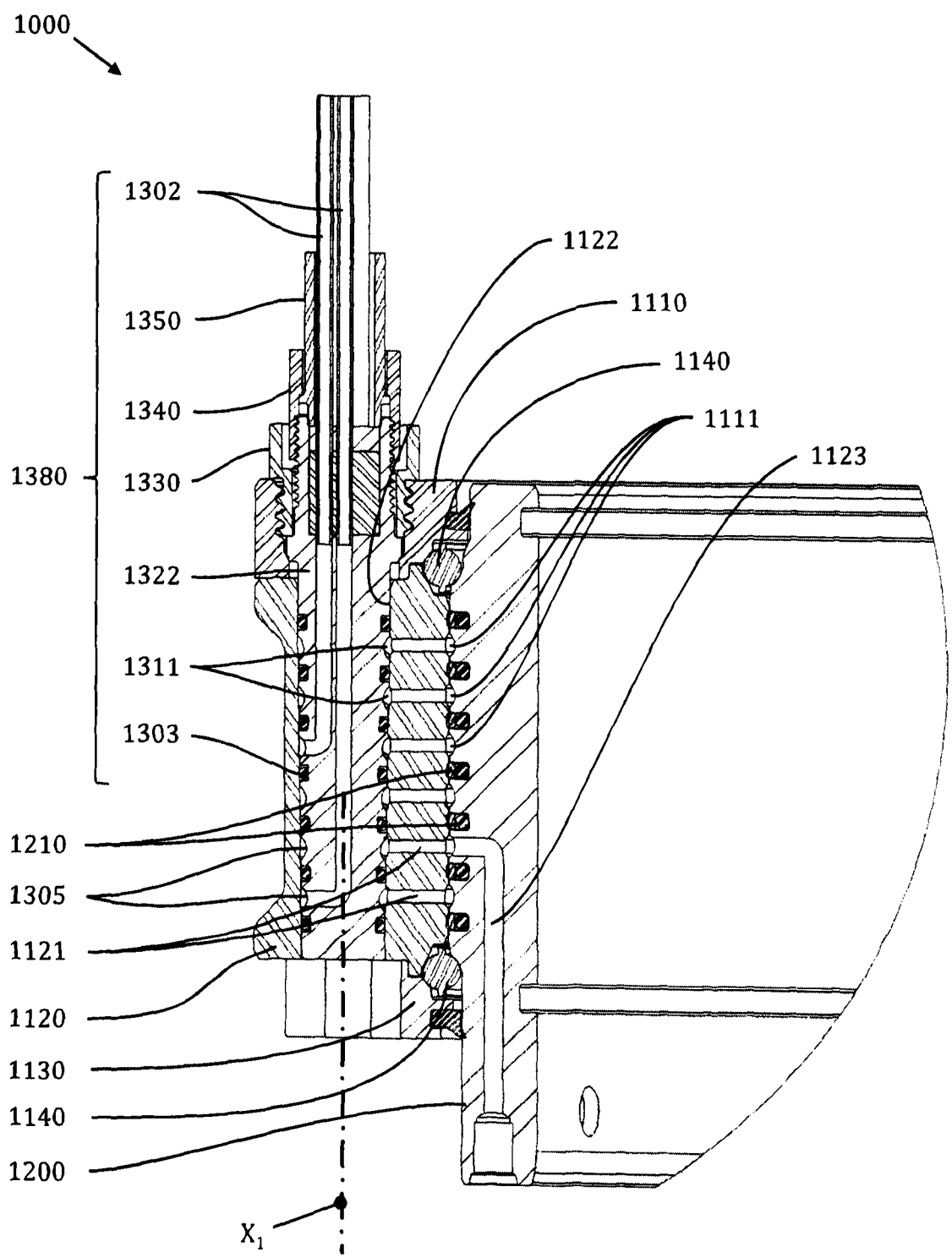
FIG. 6 is a longitudinal section through the apparatus in FIG. 5.

FIGS. 5 and 6 are isometric and sectional views of an embodiment 1000 of a fluid manifold connector apparatus incorporating a multi-channel fluid swivel apparatus, and comprising a stator assembly 1100, a rotor 1200 having a rotational axis $X_2$, and a stinger assembly 1380 as in FIGS. 1-4. Stator assembly 1100 comprises a stator sleeve 1120, an upper retaining ring 1110, and a lower retaining ring 1130, plus bearing rolling elements 1140 retained by retaining rings 1110 and 1130. Upper and lower rolling elements 1140 (shown by way of example as ball bearings) support low-torque rotational motion and controlled alignment of rotor 1200 relative to stator sleeve 1120, which carries a series of rotor seals 1210 at unique axial positions. As will be readily appreciated by persons skilled in the art, alternative bearing means such as bushings may be provided to facilitate suitable rotary movement and alignment for a given application.

When engaged with outer stator sleeve 1120, rotor seals 1210 will form a series of sealed annular fluid swivel chambers 1111, which will be in fluid communication with a receiver bore 1122 via stator sleeve fluid channels 1121 (analogous to receiver fluid inlet ports 1392 in FIGS. 1 and 2) through the side wall of stator sleeve 1120. Annular fluid swivel chambers 1111 are intersected by circumferentially-distributed rotor fluid channels 1123 that convey fluid through rotor 1200 to any fluid mechanism coupled to and rotating with rotor 1200.

Axis $X_1$ of stinger assembly 1380 may be selected to be oriented parallel to rotor axis $X_2$. When thus selected, stator sleeve fluid channels 1121 may be simple radial holes through the side wall of outer stator sleeve 1120.

Figure 7:
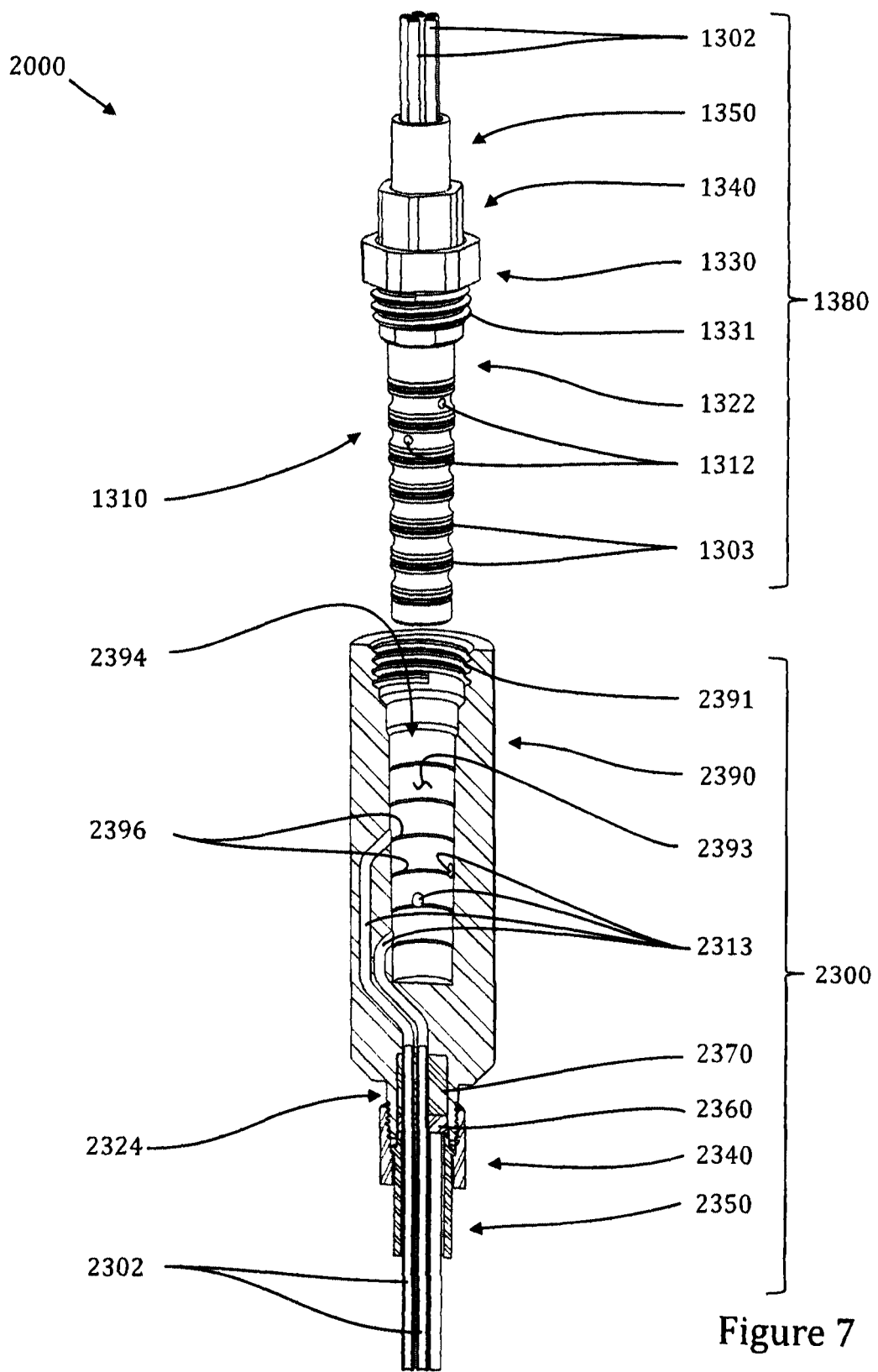
FIG. 7 is an isometric exploded view of a second embodiment of a fluid manifold connector apparatus in accordance with the present disclosure, generally corresponding to the apparatus in FIG. 1, but with a lower portion of the receiver body (shown in section) modified to receive a bundle of flow lines for inline fluid connection to a corresponding bundle of flow lines installed in the stinger assembly.
Figure 8:
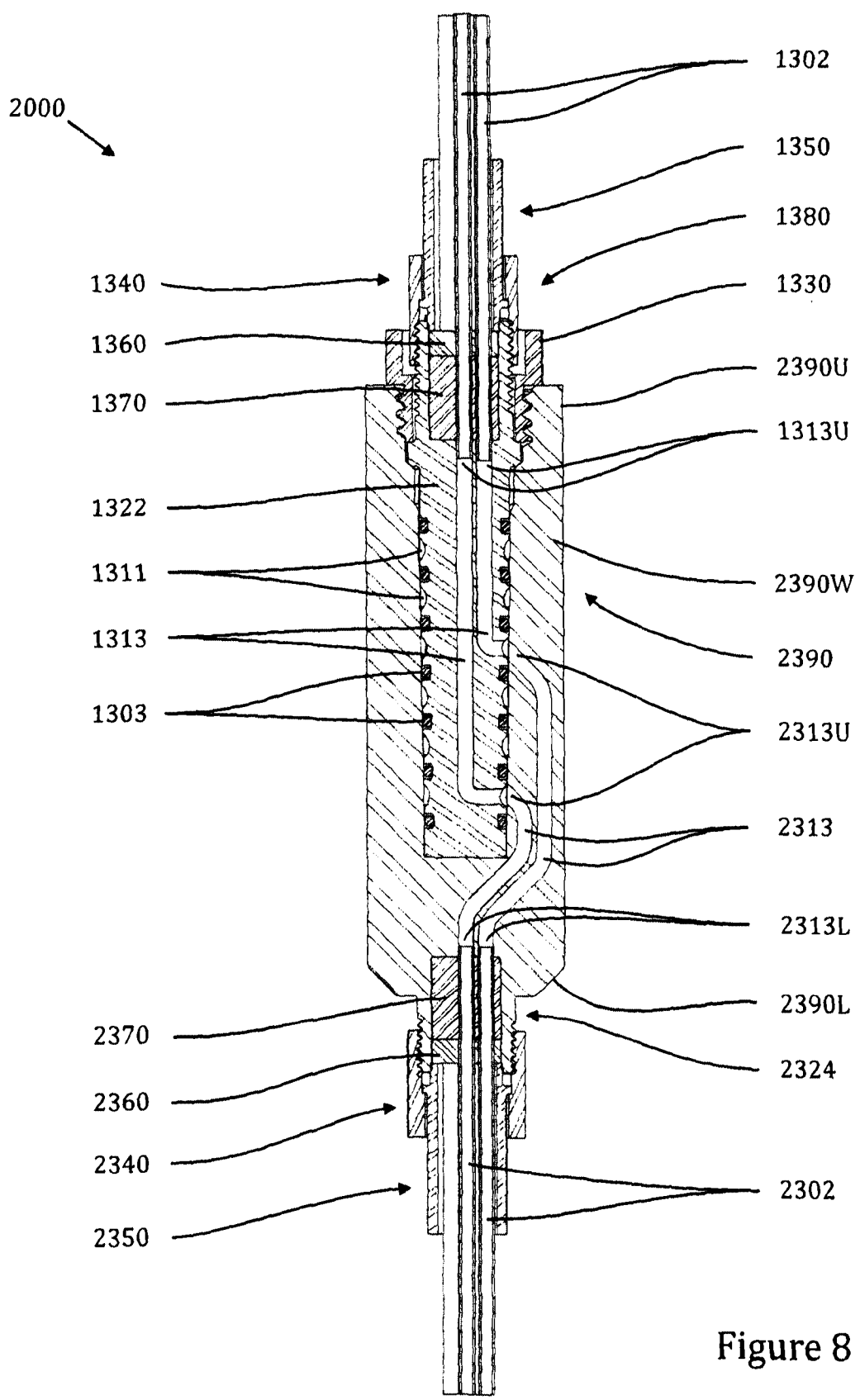
FIG. 8 is a longitudinal section through the assembled apparatus in FIG. 7, illustrating the flow paths joining the two flow line bundles.

FIGS. 7 and 8 illustrate an embodiment 2000 of a fluid manifold connector apparatus forming an in-line coupler for joining two multi-channel hose bundles. Apparatus 2000 comprises stinger assembly 1380 (generally as previously described, with stinger fluid channels 1313) and a receiver assembly 2300. Receiver assembly 2300 comprises a receiver body 2390 having a receiver upper end 2390U, a receiver lower end 2390L, a receiver bore 2394, a receiver bore surface 2393, a receiver wall 2390W, and a plurality of receiver fluid channels 2313 formed in receiver wall 2390W.

Receiver fluid channels 2313 are analogous to receiver fluid inlet ports 1392 in receiver body 1390 in the sense that their upper ends 2313U (alternatively referred to herein as receiver fluid inlet ports) are in fluid communication with receiver bore 2394 at axial spacings matching the axial spacings of stinger fluid outlet ports 1312. However, rather than being vertically aligned like stinger fluid outlet ports 1312 (as seen in FIG. 1), the upper ends 2313U of receiver fluid channels 2313 are angularly offset from each other (as illustrated in the cross-sectional view of receiver body 2390 in FIG. 7), and receiver fluid channels 2313 proceed downward from their upper ends 2313U within receiver wall 2390W to lower ends 2313L (alternatively referred to herein as receiver fluid outlet ports) intercepting the bore of a receiver extension sleeve 2324 at receiver lower end 2390L.

In the illustrated embodiment, receiver extension sleeve 2324 is essentially identical to stinger extension sleeve 1324 except that it is oriented 180 degrees thereto. Accordingly, a plug 2370, a piston spacer 2360, a piston 2350, and a drive collar 2340 (essentially identical to plug 1370, piston spacer 1360, piston 1350, and drive collar 1340, respectively), may be installed in association with receiver extension sleeve 2324. A second plurality of flow lines 2302 can then be installed in fluid communication with lower ends 2393L of receiver fluid channels 2313, in the same manner as the first plurality of flow lines 1302 are installed in stinger body 1322, such that when the lower section of stinger body 1322 is installed within receiver bore 2394, each flow line 2302 will be in fluid communication with a corresponding one of the first plurality of flow lines 1302.

FIGS. 9 and 10 illustrate an embodiment 3000 of a fluid manifold connector apparatus comprising a stinger body 3310 and a receiver body 3390 defining a receiver bore 3394 having a receiver bore surface 3393, and in which stinger body 3310 is selectively movable between two or more axial positions relative to receiver body 3390. Stinger body 3310 is generally similar to stinger body 2322, with stinger fluid channels 3313 and stinger fluid outlet ports 3312 similar to stinger fluid channels 1313 and stinger fluid outlet ports 1312, respectively, except that it includes a stinger body extension 3320 at its lower end. Receiver body 3390 is generally similar to receiver body 1390 except that:

receiver bore 3394 includes a receiver bore extension 3395 configured to receive stinger body extension 3320; and receiver bore 3394 has an annular recess 3397 similar to annular recess 1395 in receiver bore 1394 except that the axial length of annular recess 3397 is greater than that of annular recess 1395.

Except as noted otherwise, the other elements and operative features of stinger body 3310 and receiver body 3390 are essentially the same as previously described for stinger body 1322 and receiver body 1390, respectively. Accordingly, such common elements and features are referred to by the same reference numbers in FIGS. 9 and 10, and they are not described further in the present discussion of fluid manifold connector apparatus 3000.

Stinger body extension 3320 incorporates an axial position retention means 3321 in the form of a spring-loaded ball that is selectively engageable with any one of a plurality of annular axial position grooves 3396 in receiver extension bore 3395. As will be readily appreciated by persons skilled in the art, different axial position retention means, such as threads or a breech lock, to provide suitable control over axial position may be used without departing from the scope of the present disclosure.

In the illustrated embodiment, apparatus 3000 provides for movement of stinger 3310 within receiver bore 3394 between:

a "closed" upper axial position (as shown in FIG. 9) in which stinger fluid channels 1313 are not in fluid communication with any receiver fluid inlet ports 1392; and an "open" lower axial position (as shown in FIG. 10) in which stinger fluid channels 1313 are in fluid communication with corresponding receiver fluid inlet ports 1392.

Figures 11A, 11B:
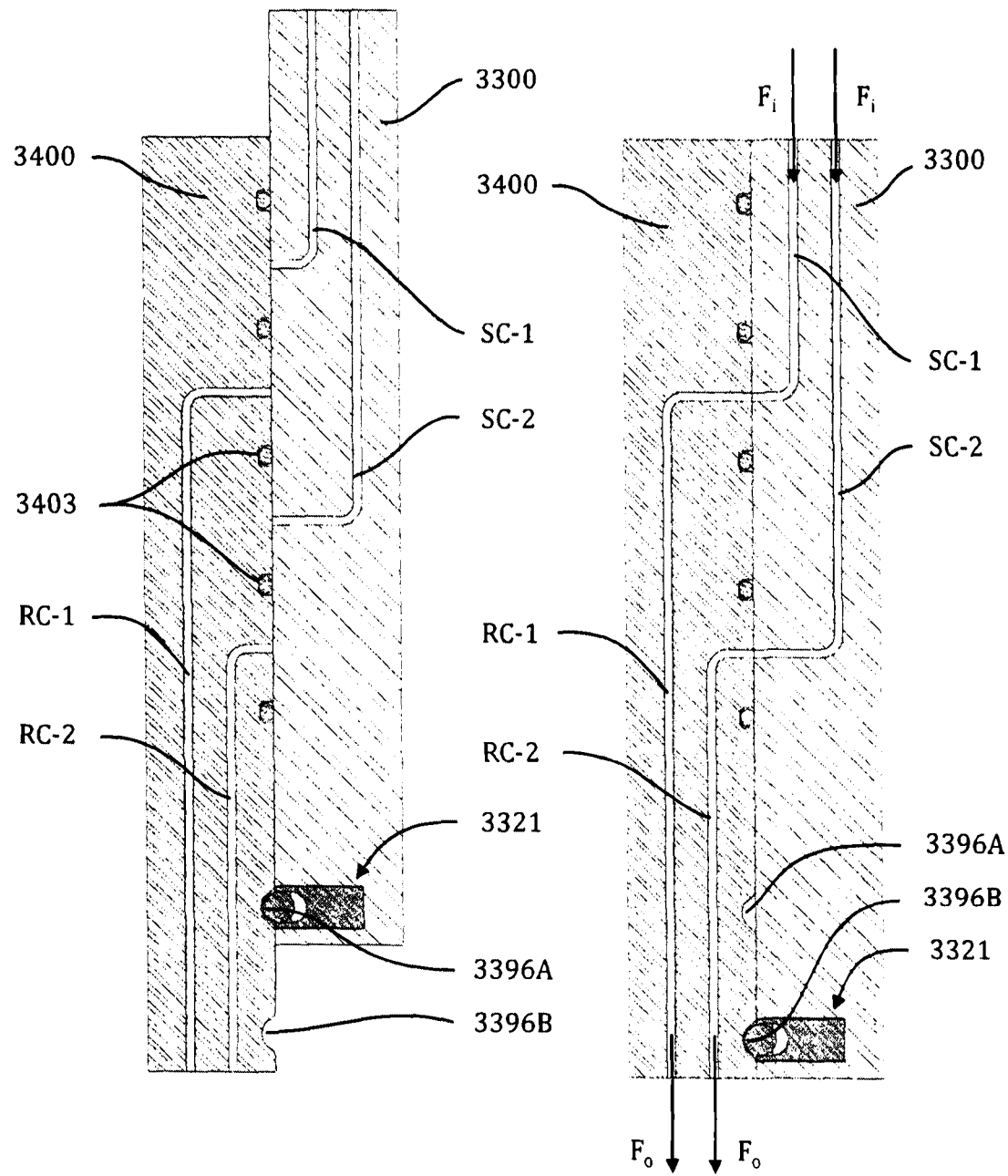
FIGS. 11A and 11B, respectively, are schematic illustrations of the apparatus in FIGS. 9 and 10, shown: (a) when the stinger body is in the upper axial position, in which flow out of the two illustrated stinger fluid channels is blocked; and (b) when the stinger body is in the lower axial position, in which the two illustrated stinger fluid channels are in fluid communication with the two illustrated receiver fluid channels.

FIGS. 11A and 11B schematically illustrate the operation of a first variant of apparatus 3000 shown in FIGS. 9 and 10, in which a stinger 3300 is selectively movable with the bore of a receiver 3400 between two axial positions defined by axial position grooves 3396A and 3396B, which are selectively engageable by an axial position retention means 3321 carried by stinger 3300 as in apparatus 3000. Receiver 3400 carries annular seals 3403 similar to annular seals 1303, and defines two receiver fluid channels indicated by reference characters RC-1 and RC-2. Stinger 3300 defines two stinger fluid channels indicated by reference characters SC-1 and SC-2.

When this first variant apparatus is in a first axial position as FIG. 11A, with axial position retention means 3321 engaging axial position groove 3396A, stinger fluid channels SC-1 and SC-2 are not in fluid communication with either of receiver fluid channels RC-1 and RC-2.

When this first variant apparatus is in a second axial position as FIG. 11B, with axial position retention means 3321 engaging axial position groove 3396B, stinger fluid channels SC-1 and SC-2 are in fluid communication receiver fluid channels RC-1 and RC-2 respectively.

Figures 12A, 12B, 12C:
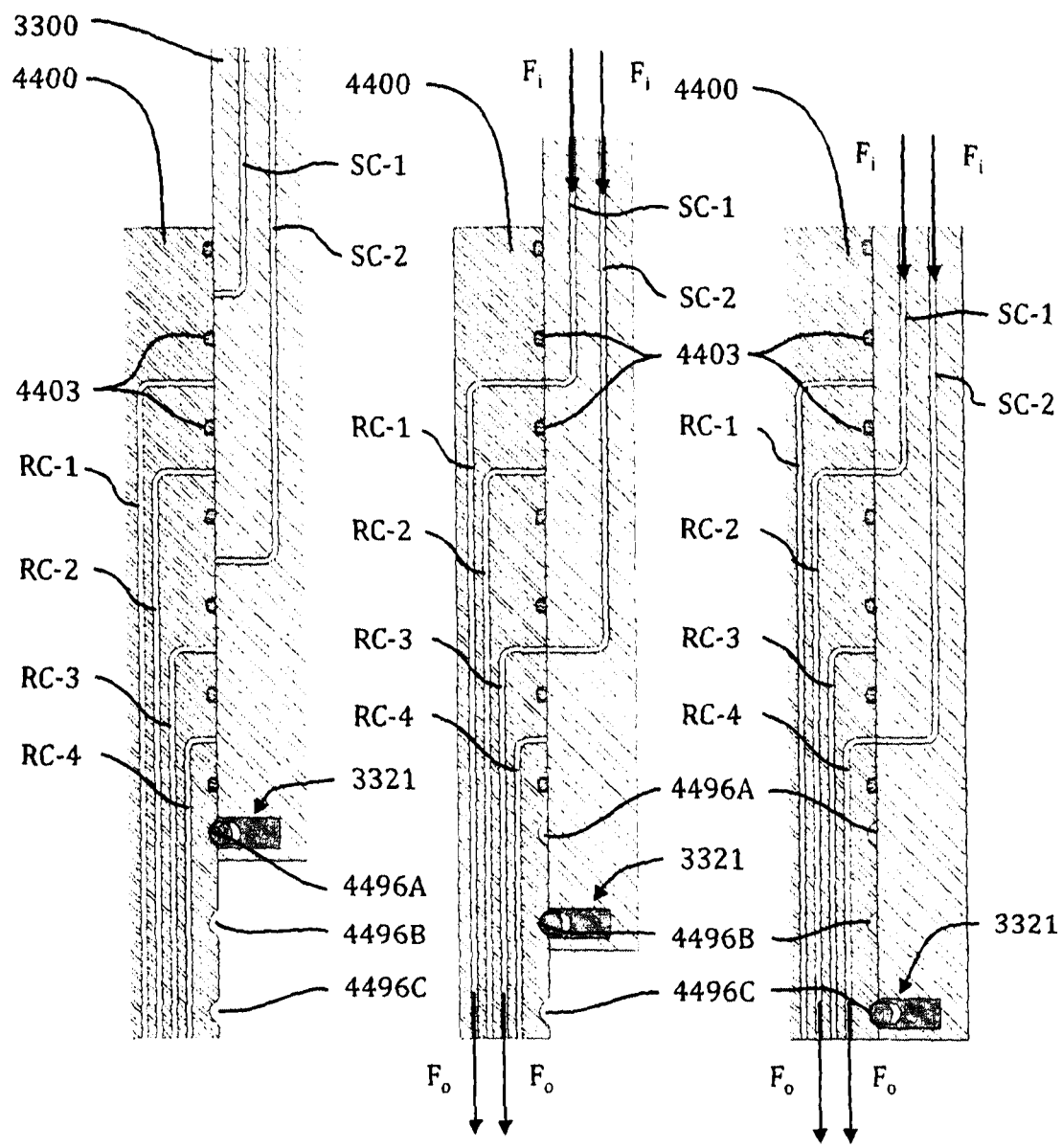
FIGS. 12A, 12B, and 12C, respectively, are schematic illustrations of a variant of the apparatus in FIG. 9, shown: (a) when the stinger body is in a first axial position, in which none of the two illustrated stinger fluid channels are in fluid communication with any of the four illustrated stinger fluid channels; (b) when the stinger body is in a second axial position, in which the two illustrated stinger fluid channels are in fluid communication with a first pair of receiver fluid channels; and (c) when the stinger body is in a third axial position, in which the two illustrated stinger fluid channels are in fluid communication with a second pair of receiver fluid channels.

FIGS. 12A, 12B, and 12C schematically illustrate the operation of a second variant of apparatus 3000 shown in FIGS. 9 and 10, in which a stinger 3300 is selectively movable with the bore of a receiver 4400 among three axial positions defined by axial position grooves 4496A, 4496B, and 4496C, which are selectively engageable by an axial position retention means 3321 carried by stinger 3300 as in apparatus 3000. Receiver 4400 carries annular seals 4403 similar to annular seals 1303, and defines four receiver fluid channels indicated by reference characters RC-1, RC-2, RC-3, and RC-4. Stinger 3300 defines two stinger fluid channels indicated by reference characters SC-1 and SC-2.

When this second variant apparatus is in a first axial position as FIG. 12A, with axial position retention means 3321 engaging axial position groove 4496A, stinger fluid channels SC-1 and SC-2 are not in fluid communication with any of receiver fluid channels RC-1, RC-2, RC-3, and RC-4.

When this second variant apparatus is in a second axial position as FIG. 12B, with axial position retention means 3321 engaging axial position groove 4496B, stinger fluid channels SC-1 and SC-2 are in fluid communication receiver fluid channels RC-1 and RC-3 respectively.

When this second variant apparatus is in a third axial position as FIG. 12C, with axial position retention means 3321 engaging axial position groove 4496C, stinger fluid channels SC-1 and SC-2 are in fluid communication receiver fluid channels RC-2 and RC-4 respectively.

The schematic arrangements illustrated in FIGS. 11A, 111B, 12A, 12B, and 12C are exemplary only. Persons skilled in the art will appreciate that other variants having different numbers and arrangements of stinger fluid channels, receiver fluid channels, and selectable axial positions can be devised without departing from the scope of the present disclosure.

It will be readily appreciated by persons of ordinary skill in the art that various modifications to embodiments in accordance with the present disclosure may be devised without departing from the scope of the present teachings, including modifications which may use equivalent structures or materials hereafter conceived or developed, or to connect a different number of fluid lines, such as by changing the length of the stinger body and the number of sealed annular fluid connector chambers.

It is to be especially understood that the scope of the present disclosure is not intended to be limited to described or illustrated embodiments, and that the substitution of a variant of a claimed or illustrated element or feature, without any substantial resultant change in functionality, will not constitute a departure from the scope of the disclosure.

In this patent document, any form of the word "comprise" is to be understood in its non-limiting sense to mean that any element or feature following such word is included, but elements or features not specifically mentioned are not excluded. A reference to an element or feature by the indefinite article "a" does not exclude the possibility that more than one such element or feature is present, unless the context clearly requires that there be one and only one such element or feature.

Any use herein of any form of the terms "connect", "mount", "attach", or any other term describing an interaction between elements is not meant to limit the interaction to direct interaction between the subject elements, and may also include indirect interaction between the elements such as through secondary or intermediary structure.

Relational and conformational terms such as "parallel", "coaxial", "axisymmetric", and "cylindrical" are not intended to denote or require absolute mathematical or geometrical precision. Accordingly, such terms are to be understood as denoting or requiring substantial precision only (e.g., "substantially parallel" or "generally cylindrical") unless the context clearly requires otherwise.

Wherever used in this document, the terms "typical" and "typically" are to be understood and interpreted in the sense of being representative of common usage or practice, and are not to be understood or interpreted as implying essentiality or invariability.

LIST OF COMPONENTS AND FEATURES

| LIST OF COMPONENTS AND FEATURES | |
| --- | --- |
| Feature Number | Description |
| 1000 | Fluid manifold connector apparatus |
| 1100 | Stator assembly |
| 1111 | Annular fluid swivel chamber |
| 1110 | Upper retaining ring |
| 1120 | Stator sleeve |
| 1121 | Stator sleeve fluid channels |
| 1122 | Receiver bore |
| 1123 | Rotor fluid channel |
| 1130 | Lower retaining ring |
| 1140 | Bearing rolling element |
| 1200 | Rotor |
| 1210 | Rotor seal |
| 1300 | Fluid manifold connector apparatus |
| 1302 | Flow line |
| 1303 | Annular seal element |
| 1304 | Annular seal groove |
| 1305 | Stinger annular recess |
| 1310 | Stinger |
| 1311 | Annular fluid connector chamber |

-continued

LIST OF COMPONENTS AND FEATURES

| Feature Number | Description |
|---|---|
| 1312 | Stinger fluid outlet port |
| 1313 | Stinger fluid channel |
| 1313U | Upper end of stinger fluid channel |
| 1314 | Extension sleeve thread |
| 1315 | Stinger extension sleeve bore |
| 1315U | Extension sleeve upper end |
| 1316 | Extension sleeve key |
| 1317 | Stinger annular flange |
| 1317A | Stinger annular flange shoulder |
| 1319 | Stinger body top surface |
| 1322 | Stinger body |
| 1324 | Stinger extension sleeve |
| 1326 | Stinger body exterior surface |
| 1330 | Stinger retention ring |
| 1331 | Retention ring thread |
| 1340 | Piston drive collar |
| 1342 | Drive collar thread |
| 1341 | Drive collar shoulder |
| 1345 | Drive collar bore |
| 1350 | Piston |
| 1350U | Piston upper end |
| 1350L | Piston lower end |
| 1351 | Piston drive flange |
| 1352 | Piston outer surface |
| 1355 | Piston bore |
| 1360 | Piston spacer |
| 1361 | Piston spacer key |
| 1362 | Piston spacer bores |
| 1370 | Plug |
| 1370U | Plug upper end |
| 1370L | Plug lower end |
| 1371 | Flow line bores |
| 1372 | Plug lower end surface |
| 1373 | Plug upper end surface |
| 1374 | Plug outer surface |
| 1380 | Stinger assembly |
| 1390 | Receiver body |
| 1390W | Receiver wall |
| 1391 | Receiver bore thread |
| 1392 | Receiver fluid inlet port |
| 1393 | Receiver bore surface |
| 1394 | Receiver bore |
| 1395 | Receiver annular recess |
| 1396 | Receiver bore diameter stepdown |
| 1400 | Fluid manifold connector apparatus |
| 1403 | Annular seal element |
| 1410 | Stinger |
| 1411 | Lower end fluid chamber |
| 1412 | Stinger fluid outlet port |
| 1412A | Auxiliary stinger fluid outlet port |
| 1413 | Stinger fluid channel |
| 1413A | Auxiliary stinger fluid channel |
| 1422 | Stinger body |
| 1450 | Receiver bore blind end |
| 1490 | Receiver body |
| 1490W | Receiver wall |
| 1492 | Receiver fluid inlet port |
| 1492A | Auxiliary receiver fluid inlet port |
| 1492B | Auxiliary receiver fluid inlet port |
| 1493 | Receiver bore surface |
| 1494 | Receiver bore |
| 2000 | Fluid manifold connector apparatus |
| 2300 | Receiver assembly |
| 2302 | Flow line |
| 2313 | Receiver fluid channel |
| 2313U | Upper end of receiver fluid channel (receiver fluid inlet port) |
| 2313L | Lower end of receiver fluid channel (receiver fluid outlet port) |
| 2324 | Receiver extension sleeve |
| 2340 | Piston drive collar |
| 2350 | Piston |
| 2360 | Piston spacer |
| 2370 | Plug |
| 2390 | Receiver body |

-continued

LIST OF COMPONENTS AND FEATURES

| Feature Number | Description |
|---|---|
| 2390U | Upper end of receiver body |
| 2390L | Lower end of receiver body |
| 2390W | Receiver body wall |
| 2391 | Receiver bore thread |
| 2393 | Receiver bore surface |
| 2394 | Receiver bore |
| 3000 | Fluid manifold connector apparatus |
| 3300 | Stinger body (schematic) |
| 3310 | Stinger body |
| 3312 | Stinger fluid outlet port |
| 3313 | Stinger fluid channel |
| 3320 | Stinger body extension |
| 3321 | Axial position retainer |
| 3390 | Receiver |
| 3392 | Receiver fluid inlet port |
| 3393 | Receiver bore surface |
| 3394 | Receiver bore |
| 3395 | Receiver bore extension |
| 3396 | Receiver bore axial position groove |
| 3396A | First receiver bore axial position groove |
| 3396B | Second receiver bore axial position groove |
| 3397 | Receiver annular recess |
| 3400 | Receiver (schematic) |
| 3403 | Annular seal element |
| 4400 | Receiver (schematic) |
| 4403 | Annular seal element |
| 4496A | First receiver bore axial position groove |
| 4496B | Second receiver bore axial position groove |
| 4496C | Third receiver bore axial position groove |
| RC-1, 2, 3, 4 | Receiver fluid channels (schematic) |
| SC-1, 2 | Stinger fluid channels (schematic) |
| $X_1$ | Stinger axis |
| $X_2$ | Rotor axis |

What is claimed is:

1. A fluid manifold connector apparatus, comprising:
 (a) a stinger assembly including an axisymmetric stinger body having an upper end, a lower end, and a top surface, and further having a stinger extension sleeve extending coaxially upward from the top surface of the stinger body, wherein:
  the stinger extension sleeve defines an extension sleeve bore having an open top end and a bottom surface, said bottom surface being coincident with the top surface of the stinger body;
  a lower section of the stinger body has a peripheral exterior stinger body surface, said exterior stinger body surface having a plurality of stinger fluid outlet ports;
  the stinger body defines a plurality of stinger fluid channels, each of which extends downward from the top surface of the stinger body to a corresponding specific one of the plurality of stinger fluid outlet ports at the exterior stinger body surface; and
  each stinger fluid outlet port is located at a unique axial distance from the top surface of the stinger body;
 (b) a receiver body having a receiver body wall defining a receiver bore having a receiver bore surface, wherein:
  the receiver bore is configured to coaxially receive the stinger body so as to form a receiver annulus between the receiver bore surface and the exterior stinger body surface; and
  a plurality of receiver fluid inlet ports extending laterally from the receiver bore surface into the receiver body wall;
 (c) connection means for connecting each of a first plurality of flow lines to the fluid manifold connector apparatus such that each of the first plurality of flow lines will be in fluid communication with the upper end of a corresponding one of the stinger fluid channels;

(d) a plurality of annular seal elements configured for installation in circumferential seal grooves formed at selected axial intervals on either the receiver bore surface or the exterior stinger body surface; and (e) stinger retention means for releasably retaining the stinger assembly within the receiver bore;

such that when the lower section of the stinger body is at least partially disposed within the receiver bore, with an annular seal element installed in each seal groove, each axially-adjacent pair of annular seal elements in sealing engagement with both the stinger body and the receiver bore surface will define an annular fluid connector chamber within the receiver annulus, with each annular fluid connector chamber being in fluid communication with a specific stinger fluid outlet port; and wherein:

(f) the connection means comprises a deformable and impermeable plug having an upper end, an upper end surface, a lower end, a lower end surface, and an outer surface extending between said upper and lower end surfaces, wherein the plug defines a plurality of longitudinal flow line bores, each of which is aligned with the upper end of a selected one of the stinger fluid channels, such that each of the first plurality of flow lines can be passed through a selected one of the flow line bores, with the outside diameter of the first plurality of flow lines and the diameters of flow line bores being selected to provide a minimal tolerance fit;

(g) the plug is disposable within the extension sleeve bore such that compression of the plug will deform the plug so as to sealingly grip the flow lines and to seal the lower end surface of the plug against the bottom surface of the extension sleeve bore; and (h) the connector apparatus further comprises plug compression means for applying axial compressive force to the upper end surface of the plug when the plug is disposed within the extension sleeve bore.

2. The fluid manifold connector apparatus as in claim 1 wherein at least one stinger fluid outlet port is intercepted by an annular recess projecting into the exterior stinger body surface.

3. The fluid manifold connector apparatus as in claim 2 wherein at least one receiver fluid inlet port is intercepted by an annular recess projecting into the receiver bore surface.

4. The fluid manifold connector apparatus as in claim 1 wherein at least one receiver fluid inlet port is intercepted by an annular recess projecting into the receiver bore surface.

5. The fluid manifold connector apparatus as in claim 1 wherein the plug compression means comprises:

(a) a piston having an upper end, a lower end, and an outer surface, and having one or more bores allowing free passage of the first plurality of flow lines; and (b) a piston drive collar, for urging downward movement of the piston relative to the stinger body, when the plug is disposed within the extension sleeve bore, so as to apply compressive axial force to the plug.

6. The fluid manifold connector apparatus as in claim 5 wherein the piston drive collar has a drive collar bore, and wherein:

(a) the drive collar bore defines a downward-facing annular drive shoulder engageable with an upward-facing surface of the piston; and (b) a lower region of the drive collar bore is internally threaded for mating engagement with an externally-threaded upper region of the stinger extension sleeve;

such that rotation of the piston drive collar engaging the stinger extension sleeve will cause the drive shoulder of the drive collar to compressively engage the upward-facing surface of the piston and thus urge downward movement of the piston relative to the stinger body.

7. The fluid manifold connector apparatus as in claim 6 wherein the upward-facing surface of the piston is provided on an annular drive flange projecting from the outer surface of the piston.

8. The fluid manifold connector apparatus as in claim 7 wherein the plug compression means is configured to induce compression of the plug by direct compressive contact of the lower end of the piston to the upper end surface of the plug.

9. The fluid manifold connector apparatus as in claim 7, further comprising a piston spacer disposed between the lower end of the piston and the upper end surface of the plug, said piston spacer defining one or more throughbores for free passage of the first plurality of flow lines.

10. The fluid manifold connector apparatus as in claim 6 wherein the plug compression means is configured to induce compression of the plug by direct compressive contact of the lower end of the piston to the upper end surface of the plug.

11. The fluid manifold connector apparatus as in claim 6, further comprising a piston spacer disposed between the lower end of the piston and the upper end surface of the plug, said piston spacer defining one or more throughbores for free passage of the first plurality of flow lines.

12. The fluid manifold connector apparatus as in claim 11 wherein the piston spacer is of cylindrical configuration.

13. The fluid manifold connector apparatus as in claim 1 wherein the stinger body further comprises an auxiliary fluid channel and the receiver bore is configured with a blind end, such that:

(a) a lower end fluid chamber is formed by the lowermost one of the plurality of sealing elements and the blind end of the receiver bore; and (b) the auxiliary fluid channel is in fluid communication with the lower end fluid chamber.

14. The fluid manifold connector apparatus as in claim 1 wherein the diameters of the annular fluid connector chambers progressively decrease from the uppermost annular fluid connector chamber toward the lowermost annular fluid connector chamber.

15. The fluid manifold connector apparatus as in claim 1 wherein:

(a) the stinger body is selectably axially movable within the receiver bore to any one of two or more axial positions;

(b) the fluid manifold connector apparatus further comprises means for releasably retaining the stinger body in any selected one of two or more axial positions; and (c) the receiver fluid inlet ports are configured such that changing the axial position of the stinger body will result in either one or more stinger fluid outlet ports being in the fluid communication with a different receiver fluid inlet port or ports, or one or more stinger fluid outlet ports not being in fluid communication with any receiver fluid inlet port.

16. The fluid manifold connector apparatus as in claim 1 wherein a receiver fluid channel extends within the receiver body wall from each of the receiver fluid inlet ports to a receiver fluid outlet port at a lower end of the receiver body, for connection in fluid communication with one of a second plurality of flow lines.

17. A multi-channel fluid swivel apparatus incorporating a fluid manifold connector apparatus as in claim 1.

\* \* \* \* \*